Feb. 5, 1946.  L. W. IMM  2,394,181

MULTIPLYING MECHANISM

Filed Oct. 29, 1943  5 Sheets-Sheet 1

INVENTOR.
Lewis W. Imm
BY H. W. Baker
ATTORNEY.

Feb. 5, 1946. L. W. IMM 2,394,181
MULTIPLYING MECHANISM
Filed Oct. 29, 1943 5 Sheets-Sheet 2

INVENTOR.
Lewis W. Imm
BY H. W. Baker
ATTORNEY.

Feb. 5, 1946.   L. W. IMM   2,394,181
MULTIPLYING MECHANISM
Filed Oct. 29, 1943   5 Sheets-Sheet 3

INVENTOR.
Lewis W. Imm
BY H. W. Baker
ATTORNEY.

Feb. 5, 1946. L. W. IMM 2,394,181
MULTIPLYING MECHANISM
Filed Oct. 29, 1943 5 Sheets-Sheet 4
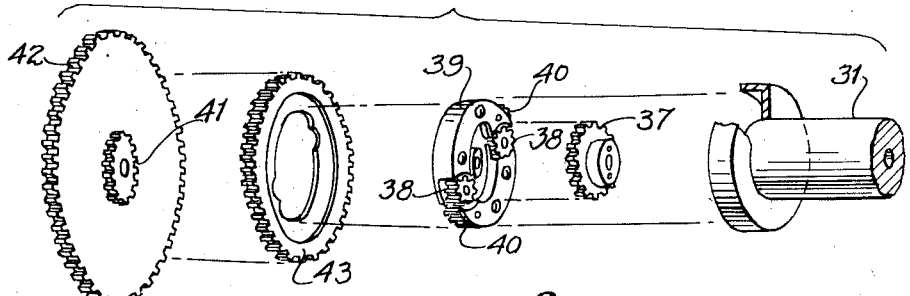
Fig. 6.
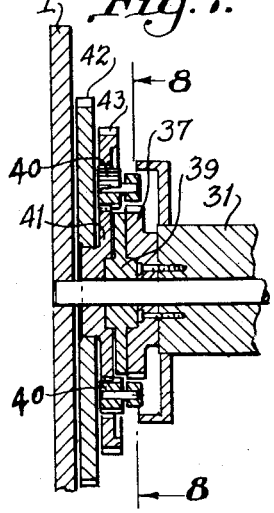
Fig. 7.
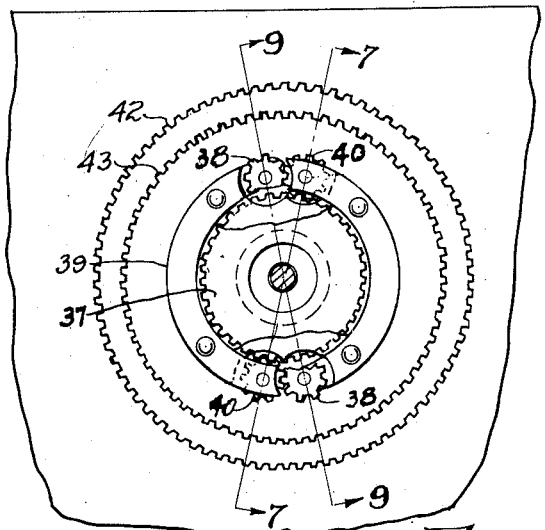
Fig. 8.
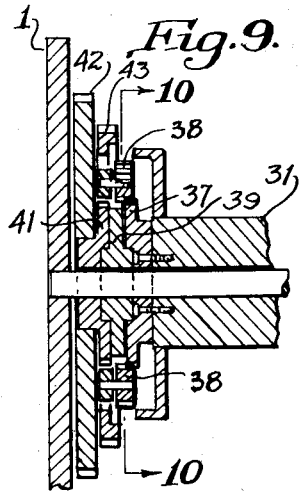
Fig. 9.
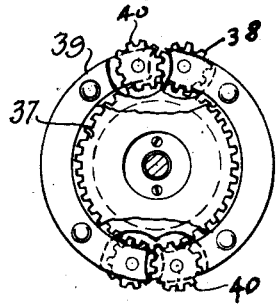
Fig. 10.
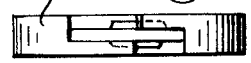
Fig. 12.
Fig. 11.
INVENTOR.
Lewis W. Imm
BY H. W. Baker
ATTORNEY.

Feb. 5, 1946. L. W. IMM 2,394,181
MULTIPLYING MECHANISM
Filed Oct. 29, 1943 5 Sheets-Sheet 5

INVENTOR.
Lewis W. Imm
BY
H. W. Baker
ATTORNEY.

Patented Feb. 5, 1946

2,394,181

UNITED STATES PATENT OFFICE 2,394,181

MULTIPLYING MECHANISM

Lewis William Imm, Glendale, Calif.

Application October 29, 1943, Serial No. 508,232

1 Claim. (Cl. 235—61)

The object of this invention is to provide a multiplying mechanism operating on the principle that the product of two numbers such as $a$ and $b$ may be obtained by squaring the sum of the numbers and the difference of the numbers, then subtracting the square of the difference of the numbers from the square of the sum of the numbers giving $4ab$ and then dividing by 4. In my companion application, Serial No. 508,231, filed October 29, 1943, for a Squaring mechanism, I have disclosed and claimed the combination of a cone, a cylinder, and a cable trained about the cone and cylinder so that part of the cable wound upon the cone forms an Archimedean spiral but in which the cone instead of tapering to a physical point is truncated at a point where its radius is about .2 to .25 of an inch, such truncation being necessary in order to facilitate manufacture of a squaring mechanism operating on the principle disclosed. Due to the truncation of the cone a differential mechanism is employed in a manner disclosed in detail in the aforesaid application to compensate for the truncation of the cone by in effect transferring the zero point of the cone to the plane in which it is truncated.

The application is a continuation in part of my co-pending application for Squaring mechanism, Serial Number 508,231, filed as of even date herewith.

Figure 1:
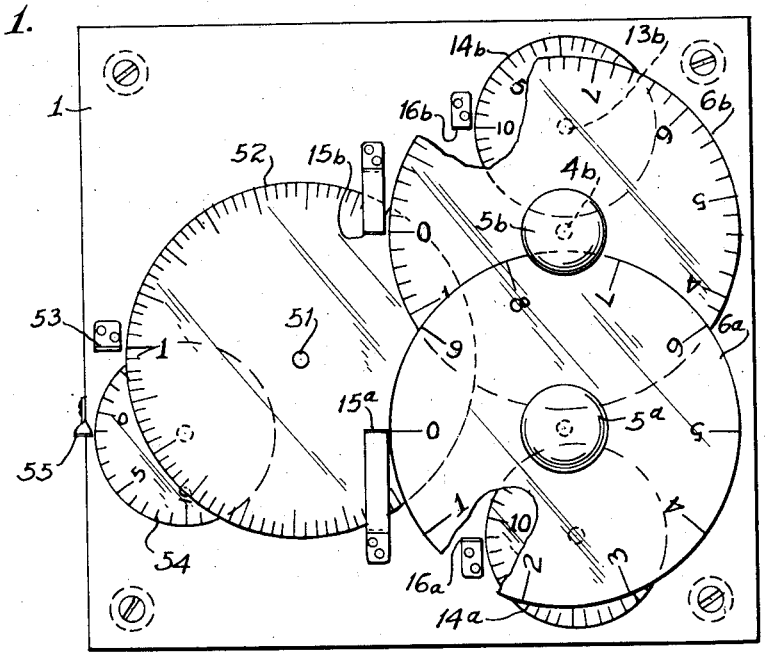
Figure 2:
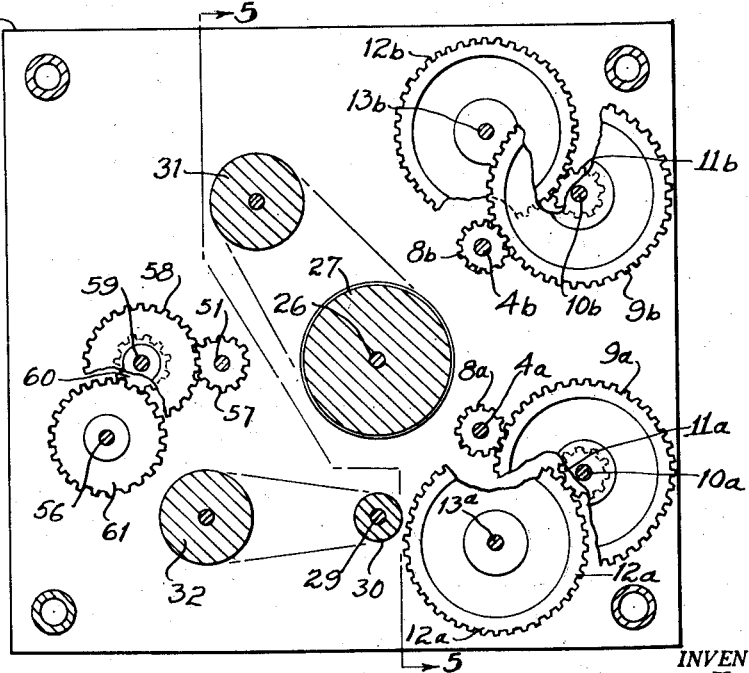
Figure 3:
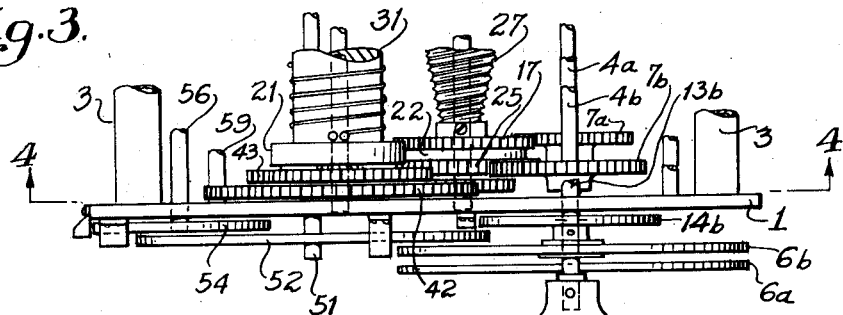
Figure 4:
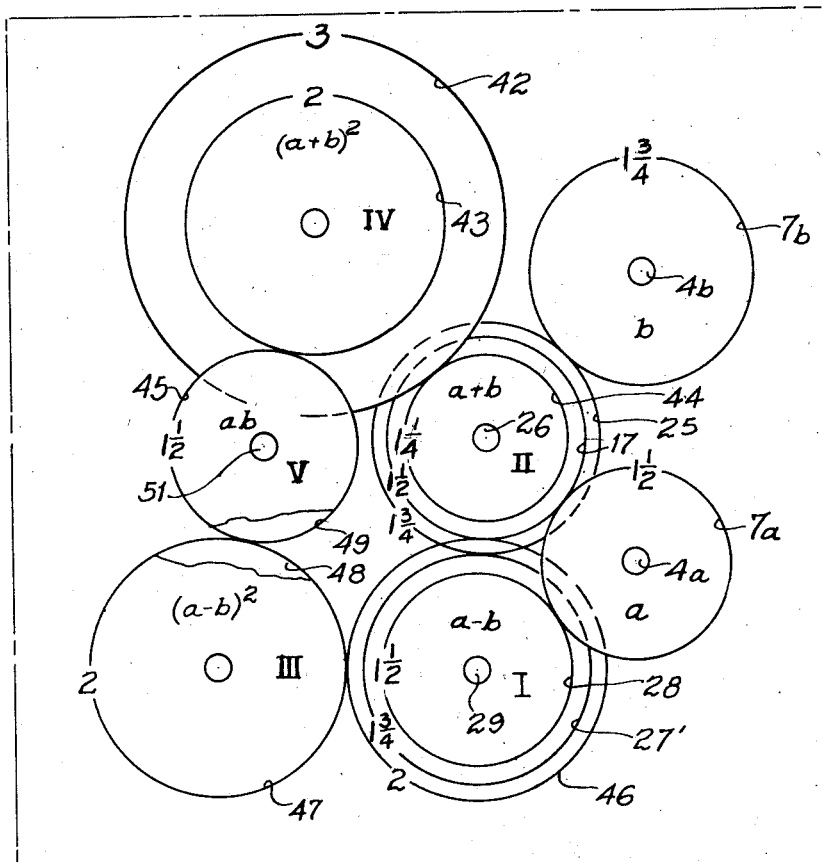
Figure 5:
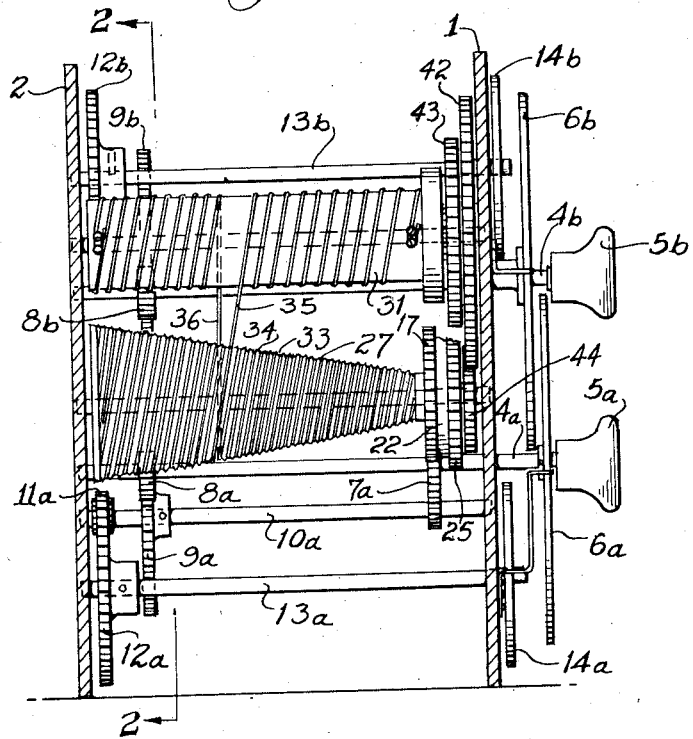
Figure 14:
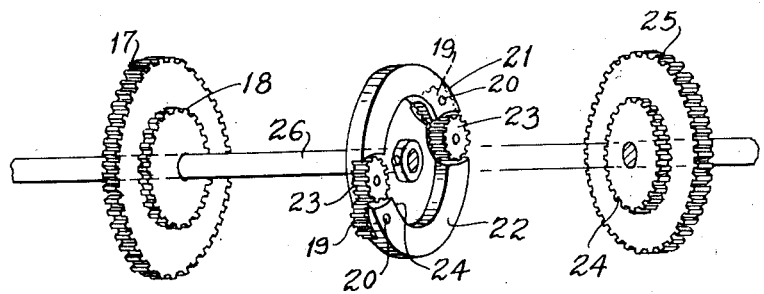
Figure 13:
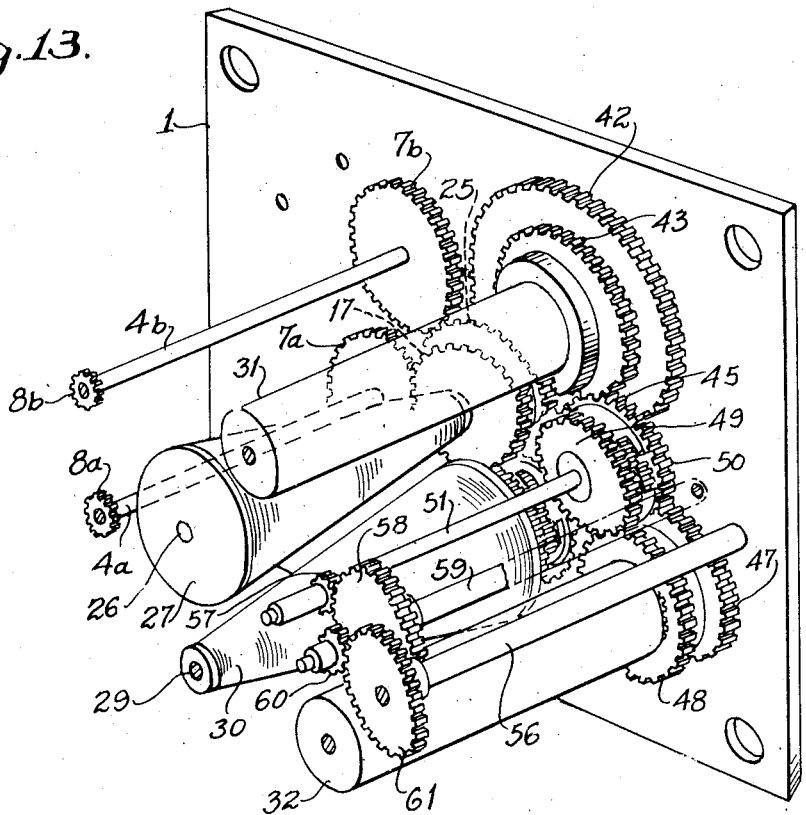

The invention may be better understood by referring to the attached drawings, in which:

Fig. 1 is a front elevational view of the machine,

Fig. 2 is a front elevational view partly in cross section, of certain of the parts mounted on the back wall and taken on substantially the line 2—2 of Fig. 3, Fig. 3 is a fragmentary top plan view of the parts mounted on the front wall of the machine, Fig. 4 is a diagrammatic view of a part of the gearing employed, Fig. 5 is an elevational view on substantially the line 5—5 of Fig. 2, Fig. 6 is an exploded view of one of the differential mechanisms, Fig. 7 is a cross section view of the differential mechanism shown in Fig. 6 and taken on the line 7—7 of Fig. 8, Fig. 8 is an elevational view, partly in cross section, of the differential mechanism shown in Fig. 6 and taken on approximately the line 8—8 of Fig. 7, Fig. 9 is a view similar to Fig. 7 but taken on the line 9—9 of Fig. 8, Fig. 10 is an elevational view taken on the line 10—10 of Fig. 9, Fig. 11 is a side elevational view of the spider forming a part of the differential mechanism shown in Fig. 6, Fig. 12 is a top plan view of the spider shown in Fig. 11, Fig. 13 is a perspective view of the internal mechanism of the machine looking toward the front wall, certain of the parts being omitted, and Fig. 14 is an exploded view of a second type of differential mechanism.

The frame of the machine consists of a front wall 1, a rear wall 2 and rods 3, spacing and connecting the said walls. Of course the machine is provided with a suitable housing, not shown.

Rotatably mounted in the said walls are input shafts $4a$ and $4b$ actuated by knobs $5a$ and $5b$ respectively. The shaft $4b$ has secured thereto a disc $6b$, a gear $7b$ and a pinion $8b$ while the shaft $4a$ has secured thereto a disc $6a$, a gear $7a$ and a pinion $8a$. The pinion $8b$ drives a gear $9b$ secured to shaft $10b$ to which is secured pinion $11b$, which drives gear $12b$ secured to shaft $13b$, to which is secured disc $14b$. The dial or disc $6b$ is calibrated in suitable scale digits to represent units to be read relative to a reference point $15b$, while dial $14b$ is calibrated in suitable digits to represent a higher scale to be read relative to a reference point $16b$.

In like manner the pinion $8a$ drives gear $9a$ secured to a shaft $10a$, to which is secured pinion $11a$, which drives gear $12a$ secured to shaft $13a$, to which is secured the higher scale disc $14a$, the units disc $6a$ being read relative to a reference point $15a$ and the higher scale disc $14a$ being read relative to a reference point $16a$.

The discs $6b$ and $14b$ simply indicate the value entered by rotating the knob $5b$ while the discs $6a$ and $14a$ indicate the value entered by rotating the knob $5a$.

There are five differential mechanisms which I have indicated in Fig. 4 as I to V inclusive. The gear $7a$ drives a gear 17 of differential mechanism No. II which type of differential mechanism is shown in Fig. 14. The gear 17 has secured thereto a pinion 18 which drives pinions 19 mounted on arbors 20, carried by arms 21 of a spider 22, which pinions 19 drive pinions 23 carried by arms 24 of the spider. The pinions 23 mesh with the pinion 24 secured to gear 25.

The gears 17 and 25 are free to rotate on shaft 26 while the spider 22 is secured to the said shaft 26.

The gear 7b drives the gear 25 to which is secured the pinion 24. The gears 17 and 25 rotate in the same direction when increased values are being set into the mechanism by knobs 5a and 5b so that the shaft 26 and cone 27 secured thereto rotate an amount corresponding to the sum of $a+b$.

Differential mechanism No. I is similar to differential mechanism No. II. It will be remembered that knob 5b actuates gear 25. This gear 25 drives gear 27' while gear 7a drives gear 28 of differential mechanism No. I. These gears are freely mounted on shaft 29 to which is secured the cone 30. These gears form a part of differential mechanism No. I which operates precisely as the differential mechanism shown in Fig. 14, except that obviously in differential mechanism No. II the gears rotate in the same direction when increased values are being added so as to give the sum of $a+b$ while in differential mechanism No. I they will rotate in opposite directions to give a value corresponding to $a-b$.

As heretofore stated, the cones 27 and 30 are secured to shafts 26 and 29 respectively. As shown in Fig. 13 these cones taper in opposite directions, the small end of the cone 27 being nearest the front wall, while the small end of the cone 30 is near the rear wall. While I call these cones, each is more precisely a frustum of a cone. These cones act in conjunction with cylinders 31 and 32 respectively.

As fully explained in my co-pending application, Serial Number 508,231, each of these cones is provided with two sets of spiral threads 33 and 34 which receive ribbons or cables 35 and 36 respectively. One of these cables is secured to the small end of its cone such as in Fig. 5, the end nearest the front plate, and after leaving the cone is wound around its cylinder and is connected to the end of its cylinder nearest the rear wall. The other cable is secured to the large or rear end of the cone and after leaving the cone is wound around its cylinder and is connected to the front end of its cylinder. These threads form Archimedean spirals.

It is obvious that if the cone tapered to an absolute zero value, an indicator might be actuated to indicate directly the square of the number corresponding to the rotations of the cone. However, it is not practical for the cone to extend to a point. It is, therefore, necessary to provide a differential mechanism to take care of certain complications which arise. This is apparent for if the cone extended to a point and if the cable secured to that point had not yet been wound about the cone, one revolution of the cone would wind very little of that cable on the cylinder and, hence, would rotate the cylinder very slightly. However, with the cable being attached to the cone at its smallest point, one rotation of the cone would now impart far more rotation to the cylinder than if the cone had extended to the zero point.

This differential IV is of the type shown in Fig. 6 in which the cylinder 31 actuated by the cone 27 has secured thereto a pinion 37 which meshes with and drives the pinions 38 on a differential spider 39, which also carries pinions 40 meshing with the pinions 38 and which pinions 40 mesh with the pinion 41 secured to a gear 42. The gear 43 is secured to the spider 39. The gear 44 (Fig. 4) is secured to the shaft 26 to which is also secured the cone 27, and this gear 44 drives the gear 42. It, therefore, appears that the spider and gear 43 are actuated both by the rotations of cylinder 31 from the squaring mechanism as well as by the gear 42.

As above stated, if the cone would extend to a zero value, and if the value entered on the cone as above described were $a+b$, obviously the cylinder would be rotated in the amount corresponding to $a^2+2ab+b^2$, or if the cone were rotated in an amount corresponding to $a-b$, the cylinder would rotate in an amount corresponding to $a^2-2ab+b^2$. However, with the radius of the cone at its smallest point having a value of $c$, we are in effect not squaring $a+b$, but are squaring $a+b+c$, obtaining $a^2+2ab+b^2+2c(a+b)+c^2$. Therefore, mechanisms must be provided to eliminate the $2c(a+b)+c^2$. This is done as follows:

The $2c(a+b)$ is eliminated by differential No. IV while the value of $c^2$ is subtracted by the gear setting from the output of differentials IV to V.

The diameter of the small end of the cone 27 is to the diameter of the cylinder 31 as the gear 44 secured to the shaft 26 is to the gear 42. If the gear 25 is to the gear 42 as 1¾ is to 3 as indicated in Fig. 4, and if the diameter of the cylinder 31 is one inch, the diameter of the small end of the cone 27 would be .416667 inch. Since these numbers are somewhat involved, the operation of this differential No. IV might be more easily explained if, for the purpose of illustration, we consider that the radius of the cone at its smallest point is .25 inch, the diameter of the cylinder is one inch and the gear ratio between the gears 25 and 42 is as 1 is to 2. Furthermore, the operation might be further simplified to show how the $2c(a+b)$ is eliminated by differential No. IV if we allow $a+b$ to equal $x$ so that the expression $a+b+c$ becomes $x+c$ and the square of this number equals $x^2+2xc+c^2$, $x$ being the number to be squared and $c$ being the radius of the cone at the smallest point or, in the illustration given above, .25 inch. It will be noted that there is a relationship between $x$ and $c$, for if the cone increases in radius .01 inch for each rotation, $x$ would be equal to the radius of the cone at its smallest point $c$ plus the number of revolutions which the cone rotates multiplied by its increase in radius per rotation. Assuming that $x$ equals any number which we desire to square such as 5, then the radius of the cone at the take-off point would be .3". We would now have fed enough wire from the cone to the cylinder to rotate the cylinder and the pinion 37 2.75 times. The gear 42 would now have rotated in the opposite direction from the pinion 37 2½ revolutions if the gear ratio in the hypothetical example given were 1 to 2. The net result would be that the gear 43 would have rotated ½ of the difference between the rotations of the gear 42 and pinion 37, or ⅛ of a revolution. Obviously this amount of rotation is proportional to the number 5 being squared, and it might be directly indicated if the gear 43 drove another gear of ½ its size so that its shaft would have rotated ¼ of a revolution. If now an indicator were connected with this last gear and had calibrations reading from 0 to 100, the reading given by the dial would be 100×.25 or 25, which is the square of the number 5. In the above example the $c$ squared would be .0625 and, of course, this number could be eliminated by the gear setting of the output of differential IV into the differential V. In practice, however, the gear 43 drives a gear 45 of differential No. V and these gear ratios are not 2 to 1, but this can be taken care of by the dial calibrations which will be hereinafter described.

When the knobs 5a and 5b are at their zero positions, then the $a+b$ cone 27 has its cable 36 leaving the cone at the smallest point. This is because the sum of $a+b$ will never be below zero. But on the $a-b$ cone 30 the said cable leaves the cone at approximately its mid-point when the knobs 5a and 5b are at their zero positions for the reason that the value $a+b$ may be either positive or negative depending upon whether or not $a$ is greater than $b$. The zero position of the cone 27 is therefore its smallest point while the zero position of the cone 30 is its mid-portion.

It will be remembered that the differential No. I which is the $a-b$ differential is driven from the knobs 5a and 5b, the gear 7a entering the value $a$ through the gear 28 while the value minus $b$ is entered through the gears 7b, 25 and 27'. A gear 46 is secured to the cone shaft 29 and this gear meshes with and drives the gear 47 of differential mechanism No. III. This mechanism is the same type of mechanism as shown in Fig. 6 so that the gear 47 is the same type gear as the gear 42 and carries a pinion identical to the pinion 41. The cylinder 32 carries a pinion identical to pinion 37 and drives a spider identical to spider 39 to which is secured a gear 48 which corresponds to the gear 43 of Fig. 6. Differential No. III, therefore, eliminates $2c(a-b)$ in precisely the same manner as differential No. IV eliminated $2c(a+b)$.

The gear 48 of differential No. III meshes with and drives gear 49 of differential No. V. The gear setting between these gears subtracts the value $c^2$.

It is, therefore, apparent that gear 43 actuates differential No. V by an amount $a^2+2ab+b^2$ while the gear 48 enters a value into differential No. V of $a^2-2ab+b^2$.

The differential No. V is of the same type as the differential shown in Fig. 14 so that the gear 45 corresponds to the gear 25 and the gear 49 corresponds to the gear 17, while the spider, corresponding to spider 22, is secured to output shaft 51. The function of this differential mechanism No. V might be better understood by giving a specific illustration as to its operation. If the input knobs for $a$ and $b$ are at zero, then the output shaft 51 would be at its zero position. Suppose we increase $a$ from 0 to 10, leaving $b$ at zero. The gear 49 would, during this operation, rotate anti-clockwise ¼ of a revolution while the gear 45 would have rotated clockwise ¼ of a revolution so that the output shaft 51 remains stationary. If we now entered a value for $b$ of 5, the gear 49 would move clockwise $\frac{1}{16}$ of a revolution while the gear 45 would rotate clockwise $\frac{1}{16}$ of a revolution so that the gear 49 is $\frac{1}{16}$ of a revolution anti-clockwise from its zero point, and the gear 45 is $\frac{1}{16}$ of a revolution clockwise from its zero point with the net result that the output shaft 51 has rotated clockwise by ½ of the difference between $\frac{1}{16}$ and $\frac{1}{16}$ or in other words, it would have rotated ¼ of a revolution clockwise. The gear 43 rotated the gear 45, ¼ of a revolution for 100 units in terms of $(a+b)^2$. Therefore one of the revolutions of gear 45 would equal 400 units in terms of $(a+b)^2$. The same is true of gear 49 rotating in the opposite direction in terms of $(a-b)^2$. The differential spider moves ½ of the amount of rotation of either input and in the same direction as the movement of the input. Therefore, the calibration of the spider shaft 51 would be 800 units in terms of $(a+b)^2-(a-b)^2$. This, however, is $4ab$. The calibrations on the dial attached to the shaft 51 would be 800 divided by 4 or 200 units per revolution in terms of $ab$. The ¼ revolution would, therefore, equal 50 units or the product of $a \times b$ in the illustration used when $a$ equals 10 and $b$ equals 5.

The output shaft 51 has secured thereto a units dial 52 to be read relative to a reference line 53. A tens dial 54 is also provided to be read relative to a reference line 55 which tens dial is on a shaft 56. The shaft 51 is provided with a pinion 57 which drives gear 58 secured to shaft 59, to which is secured gear 60 which drives a gear 61 on shaft 56.

It is, therefore, apparent that the above described mechanism will multiply any two numbers such as $a$ and $b$ and irrespective of the fact of whether $a$ is larger or smaller than $b$.

While I have shown the multiplying mechanism as provided with manually operated input knobs and with scales representing the output, I fully realize that one of the principal utilities of this invention would be as a part of a larger machine which requires direct multiplication as one of the functions thereof. In practice, therefore, the inputs instead of being knobs, would probably be operated from other mechanism of a more complicated machine, and the output might be a direct reading indicator or it might be the input to some other part of the machine of which it formed a part.

I realize that many changes may be made in the specific form of the invention as shown by way of illustration herein. I, therefore, desire to claim the same broadly except as I might limit myself in the following claim.

Having now described my invention I claim:

In a multiplying mechanism, a pair of squaring mechanisms each comprising an input cone element, an output cylinder element, a cable wound on both said cone and said cylinder, and a differential mechanism disposed coaxially with each of said cylinder elements and having an operating connection therewith, all of said elements being mounted on parallel shafts supported by a pair of frame plates; means for adding two variable numbers comprising a third differential mechanism coaxial with the cone element of one of said squaring mechanisms and having an operating connection therewith, means for subtracting one of said variable numbers from the other comprising a fourth differential mechanism coaxial with the cone element of the other of said squaring mechanisms and having an operating connection therewith, and a further differential mechanism mounted on an additional parallel shaft and controlled jointly by said first two differential mechanisms for subtracting the square of the difference of said numbers from the square of the sum of said numbers.

LEWIS WILLIAM IMM.